(12) United States Patent
Sloane

(10) Patent No.: US 11,656,968 B2
(45) Date of Patent: *May 23, 2023

(54) SYSTEM FOR COMPUTING SYSTEM CONFIGURATION FILE STATE MIRRORING ON PEER COMPUTING DEVICES

(71) Applicant: BANK OF AMERICA CORPORATION, Charlotte, NC (US)

(72) Inventor: Brandon Sloane, Indian Land, SC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/702,603

(22) Filed: Mar. 23, 2022

(65) Prior Publication Data

US 2022/0350719 A1 Nov. 3, 2022

Related U.S. Application Data

(63) Continuation of application No. 17/246,170, filed on Apr. 30, 2021, now Pat. No. 11,307,952.

(51) Int. Cl.
*G06F 11/00* (2006.01)
*G06F 11/30* (2006.01)
*G06F 11/14* (2006.01)
*H04L 67/104* (2022.01)
*G06F 11/20* (2006.01)

(52) U.S. Cl.
CPC ...... *G06F 11/3051* (2013.01); *G06F 11/1435* (2013.01); *G06F 11/1464* (2013.01); *G06F 11/1469* (2013.01); *G06F 11/2056* (2013.01); *H04L 67/104* (2013.01)

(58) Field of Classification Search
CPC ............ G06F 11/3006; G06F 11/3058; G06F 11/1435; G06F 11/2056; G06F 11/1458; G06F 11/3051; G06F 11/1469; G06F 11/1464

See application file for complete search history.

(56) References Cited

U.S. PATENT DOCUMENTS

| 5,745,669 | A | 4/1998 | Hugard et al. |
| 7,194,260 | B1* | 3/2007 | Jabbary ................ H04W 24/00 370/251 |
| 7,251,713 | B1 | 7/2007 | Zhang |

(Continued)

*Primary Examiner* — Charles Ehne
(74) *Attorney, Agent, or Firm* — Moore & Van Allen PLLC; Seongun M. Hong

(57) ABSTRACT

A system is provided for computing system configuration file state mirroring on peer computing devices. In particular, the system may identify and select a computing device containing a configuration file to be protected by the system. The system may then store various portions of the configuration file across a plurality of trusted peer computing devices. Once the baseline values for the configuration file have been established, the system may, upon detecting any unintentional or unauthorized changes to the configuration file, initiate a reconstruction process to restore the configuration file to its baseline values. In this way, the system provides a way to maintain the integrity of protected configuration files of computing devices within the network.

18 Claims, 3 Drawing Sheets

(56) References Cited

U.S. PATENT DOCUMENTS

| | | | |
|---|---|---|---|
| 7,831,968 B1 * | 11/2010 | Weathersby | G06F 8/60 717/176 |
| 8,140,475 B1 | 3/2012 | Sparks | |
| 8,607,018 B2 | 12/2013 | Gounares et al. | |
| 8,656,134 B2 | 2/2014 | Gounares et al. | |
| 8,694,574 B2 | 4/2014 | Gounares et al. | |
| 8,752,034 B2 | 6/2014 | Gounares et al. | |
| 9,311,313 B2 | 4/2016 | Le et al. | |
| 9,442,997 B2 | 9/2016 | Newhouse | |
| 9,477,507 B2 | 10/2016 | Li et al. | |
| 9,578,088 B2 | 2/2017 | Nickolov et al. | |
| 9,614,745 B2 | 4/2017 | Mathur et al. | |
| 9,667,641 B2 | 5/2017 | Muddu et al. | |
| 9,779,111 B2 | 10/2017 | Larimore et al. | |
| 10,116,700 B2 | 10/2018 | Ylonen | |
| 10,361,859 B2 | 7/2019 | Clark et al. | |
| 10,361,877 B2 | 7/2019 | Ansari et al. | |
| 10,445,069 B2 | 10/2019 | Mohaban et al. | |
| 10,671,032 B2 | 6/2020 | Nixon et al. | |
| 10,693,900 B2 | 6/2020 | Zadeh et al. | |
| 10,944,546 B2 | 3/2021 | Maino et al. | |
| 2005/0050336 A1 | 3/2005 | Liang et al. | |
| 2006/0253668 A1 * | 11/2006 | Borowski | G06F 9/44505 711/162 |
| 2008/0209351 A1 | 8/2008 | Macadaan | |
| 2009/0012966 A1 | 1/2009 | Arai et al. | |
| 2012/0198344 A1 | 8/2012 | Tukol et al. | |
| 2018/0075163 A1 | 3/2018 | Park et al. | |
| 2018/0089259 A1 | 3/2018 | James et al. | |
| 2018/0089278 A1 | 3/2018 | Bhattacharjee et al. | |
| 2019/0163923 A1 | 5/2019 | Cavanaugh | |

* cited by examiner

```
                                    200
```

```
┌─────────────────────────────────────────────────────────────┐
│  IDENTIFY, FROM A DEVICE DATABASE, A FIRST PEER COMPUTING   │
│       DEVICE COMPRISING A FIRST CONFIGURATION FILE          │
│                            201                              │
└─────────────────────────────────────────────────────────────┘
                              │
                              ▼
┌─────────────────────────────────────────────────────────────┐
│  RETRIEVE ONE OR MORE CONFIGURATION FILE SNAPSHOTS OF       │
│  THE FIRST CONFIGURATION FILE, WHEREIN THE ONE OR MORE      │
│  CONFIGURATION FILE SNAPSHOTS COMPRISES A FIRST SNAPSHOT    │
│  OF THE FIRST CONFIGURATION FILE GENERATED AT A FIRST POINT │
│                         IN TIME                             │
│                           202                               │
└─────────────────────────────────────────────────────────────┘
                              │
                              ▼
┌─────────────────────────────────────────────────────────────┐
│   GENERATE, BASED ON THE ONE OR MORE CONFIGURATION FILE     │
│   SNAPSHOTS OF THE FIRST CONFIGURATION FILE, A SET OF       │
│   BASELINE PARAMETERS FOR THE FIRST CONFIGURATION FILE      │
│                           203                               │
└─────────────────────────────────────────────────────────────┘
                              │
                              ▼
┌─────────────────────────────────────────────────────────────┐
│   RETRIEVE A SECOND SNAPSHOT OF THE FIRST CONFIGURATION     │
│   FILE GENERATED AT A SECOND POINT IN TIME, WHEREIN THE     │
│  SECOND POINT IN TIME OCCURS AFTER THE FIRST POINT IN TIME  │
│                           204                               │
└─────────────────────────────────────────────────────────────┘
                              │
                              ▼
┌─────────────────────────────────────────────────────────────┐
│   DETECT, BASED ON COMPARING THE SECOND SNAPSHOT WITH       │
│   THE SET OF BASELINE PARAMETERS, A DEVIATION OF THE FIRST  │
│   CONFIGURATION FILE FROM THE SET OF BASELINE PARAMETERS    │
│                           205                               │
└─────────────────────────────────────────────────────────────┘
                              │
                              ▼
┌─────────────────────────────────────────────────────────────┐
│  BASED ON DETECTING THE DEVIATION, AUTOMATICALLY INITIATE   │
│    ONE OR MORE REMEDIATION PROCESSES TO REMEDY THE          │
│                         DEVIATION                           │
│                           206                               │
└─────────────────────────────────────────────────────────────┘
```

```
┌─────────────────────────────────────────────────────────────┐
│ IDENTIFY, FROM A DEVICE DATABASE, A SELECTED COMPUTING      │
│ DEVICE COMPRISING A FIRST CONFIGURATION FILE                │
│ 301                                                         │
└─────────────────────────────────────────────────────────────┘
                              ↓
┌─────────────────────────────────────────────────────────────┐
│ IDENTIFY ONE OR MORE PEER COMPUTING DEVICES ASSOCIATED      │
│ WITH THE SELECTED COMPUTING DEVICE                          │
│ 302                                                         │
└─────────────────────────────────────────────────────────────┘
                              ↓
┌─────────────────────────────────────────────────────────────┐
│ GENERATE A PLURALITY OF MIRRORED CONFIGURATION FILES,       │
│ WHEREIN EACH OF THE PLURALITY OF MIRRORED CONFIGURATION     │
│ FILES COMPRISES AT LEAST A PORTION OF THE FIRST             │
│ CONFIGURATION FILE                                          │
│ 303                                                         │
└─────────────────────────────────────────────────────────────┘
                              ↓
┌─────────────────────────────────────────────────────────────┐
│ STORE THE PLURALITY OF MIRRORED CONFIGURATION FILES ON      │
│ THE ONE OR MORE PEER COMPUTING DEVICES                      │
│ 304                                                         │
└─────────────────────────────────────────────────────────────┘
                              ↓
┌─────────────────────────────────────────────────────────────┐
│ DETECT, BASED ON COMPARING THE FIRST CONFIGURATION FILE     │
│ WITH THE PLURALITY OF MIRRORED CONFIGURATION FILES, A       │
│ CHANGE IN THE FIRST CONFIGURATION FILE                      │
│ 305                                                         │
└─────────────────────────────────────────────────────────────┘
                              ↓
┌─────────────────────────────────────────────────────────────┐
│ BASED ON DETECTING THE CHANGE IN THE FIRST                  │
│ CONFIGURATION FILE, INITIATE RECONSTRUCTION OF THE FIRST    │
│ CONFIGURATION FILE FROM THE PLURALITY OF MIRRORED           │
│ CONFIGURATION FILES                                         │
│ 306                                                         │
└─────────────────────────────────────────────────────────────┘
```

FIG. 3

SYSTEM FOR COMPUTING SYSTEM CONFIGURATION FILE STATE MIRRORING ON PEER COMPUTING DEVICES

CROSS-REFERENCE TO RELATED APPLICATION

The present application is a continuation of co-pending U.S. patent application Ser. No. 17/246,170, of the same title and filed on Apr. 30, 2021, which is assigned to the assignee hereof and the contents thereof are hereby expressly incorporated by reference herein.

FIELD OF THE INVENTION

The present disclosure embraces a system for computing system configuration file state mirroring on peer computing devices

BACKGROUND

There is a need for a way to secure and protect electronic data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for computing system configuration file state mirroring on peer computing devices. In particular, the system may identify and select a computing device containing a configuration file to be protected by the system. The system may then store various portions of the configuration file across a plurality of trusted peer computing devices. Once the baseline values for the configuration file have been established, the system may, upon detecting any unintentional or unauthorized changes to the configuration file, initiate a reconstruction process to restore the configuration file to its baseline values. In this way, the system provides a way to maintain the integrity of protected configuration files of computing devices within the network.

Accordingly, embodiments of the present disclosure provide a system for computing system configuration file state mirroring on peer computing devices, the system comprising a memory device with computer-readable program code stored thereon; a communication device; and a processing device operatively coupled to the memory device and the communication device, wherein the processing device is configured to execute the computer-readable program code to identify, from a device database, a selected computing device comprising a first configuration file; identify one or more peer computing devices associated with the selected computing device; generate a plurality of mirrored configuration files, wherein each of the plurality of mirrored configuration files comprises at least a portion of the first configuration file; store the plurality of mirrored configuration files on the one or more peer computing devices; detect, based on comparing the first configuration file with the plurality of mirrored configuration files, a change in the first configuration file; and based on detecting the change in the first configuration file, initiate reconstruction of the first configuration file from the plurality of mirrored configuration files.

In some embodiments, the computer-readable program code, when executed, further causes the processing device to generate a set of baseline parameters for the first configuration file based on the plurality of mirrored configuration files, wherein initiating reconstruction of the first configuration file comprises restoring the first configuration file using the set of baseline parameters.

In some embodiments, the computer-readable program code, when executed, further causes the processing device to detect that one or more authorized changes have been made to the first configuration file; transmit a record of the one or more authorized changes and a secret key associated with the first configuration file to the one or more peer computing devices; based on the one or more authorized changes and the secret key, update the plurality of mirrored configuration files on each of the one or more peer computing devices.

In some embodiments, the computer-readable program code, when executed, further causes the processing device to update the set of baseline parameters based on updating the plurality of mirrored configuration files.

In some embodiments, the computer-readable program code, when executed, further causes the processing device to identify, using a data analytics engine, a set of prioritized parameters within the first configuration file, wherein generating the plurality of mirrored configuration files comprises increasing a level of redundancy of the prioritized parameters.

In some embodiments, generating the plurality of mirrored configuration files comprises increases a level of redundancy of parameters within the first configuration file based on an identity of the selected computing device.

Embodiments of the present disclosure also provide a computer program product for computing system configuration file state mirroring on peer computing devices, the computer program product comprising at least one non-transitory computer readable medium having computer-readable program code portions embodied therein, the computer-readable program code portions comprising executable code portions for identifying, from a device database, a selected computing device comprising a first configuration file; identifying one or more peer computing devices associated with the selected computing device; generating a plurality of mirrored configuration files, wherein each of the plurality of mirrored configuration files comprises at least a portion of the first configuration file; storing the plurality of mirrored configuration files on the one or more peer computing devices; detecting, based on comparing the first configuration file with the plurality of mirrored configuration files, a change in the first configuration file; and based on detecting the change in the first configuration file, initiating reconstruction of the first configuration file from the plurality of mirrored configuration files.

In some embodiments, the computer-readable program code portions further comprise executable code portions for generating a set of baseline parameters for the first configuration file based on the plurality of mirrored configuration files, wherein initiating reconstruction of the first configuration file comprises restoring the first configuration file using the set of baseline parameters.

In some embodiments, the computer-readable program code portions further comprise executable code portions for detecting that one or more authorized changes have been made to the first configuration file; transmitting a record of the one or more authorized changes and a secret key associated with the first configuration file to the one or more peer computing devices; based on the one or more authorized changes and the secret key, updating the plurality of mirrored configuration files on each of the one or more peer computing devices.

In some embodiments, the computer-readable program code portions further comprise executable code portions for updating the set of baseline parameters based on updating the plurality of mirrored configuration files.

In some embodiments, the computer-readable program code portions further comprise executable code portions for identifying, using a data analytics engine, a set of prioritized parameters within the first configuration file, wherein generating the plurality of mirrored configuration files comprises increasing a level of redundancy of the prioritized parameters.

In some embodiments, generating the plurality of mirrored configuration files comprises increases a level of redundancy of parameters within the first configuration file based on an identity of the selected computing device.

Embodiments of the present disclosure also provide a computer-implemented method for computing system configuration file state mirroring on peer computing devices, wherein the computer-implemented method comprises identifying, from a device database, a selected computing device comprising a first configuration file; identifying one or more peer computing devices associated with the selected computing device; generating a plurality of mirrored configuration files, wherein each of the plurality of mirrored configuration files comprises at least a portion of the first configuration file; storing the plurality of mirrored configuration files on the one or more peer computing devices; detecting, based on comparing the first configuration file with the plurality of mirrored configuration files, a change in the first configuration file; and based on detecting the change in the first configuration file, initiating reconstruction of the first configuration file from the plurality of mirrored configuration files.

In some embodiments, the computer-implemented method further comprises generating a set of baseline parameters for the first configuration file based on the plurality of mirrored configuration files, wherein initiating reconstruction of the first configuration file comprises restoring the first configuration file using the set of baseline parameters.

In some embodiments, the computer-implemented method further comprises detecting that one or more authorized changes have been made to the first configuration file; transmitting a record of the one or more authorized changes and a secret key associated with the first configuration file to the one or more peer computing devices; based on the one or more authorized changes and the secret key, updating the plurality of mirrored configuration files on each of the one or more peer computing devices.

In some embodiments, the computer-implemented method further comprises updating the set of baseline parameters based on updating the plurality of mirrored configuration files.

In some embodiments, the computer-implemented method further comprises identifying, using a data analytics engine, a set of prioritized parameters within the first configuration file, wherein generating the plurality of mirrored configuration files comprises increasing a level of redundancy of the prioritized parameters.

In some embodiments, generating the plurality of mirrored configuration files comprises increases a level of redundancy of parameters within the first configuration file based on an identity of the selected computing device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
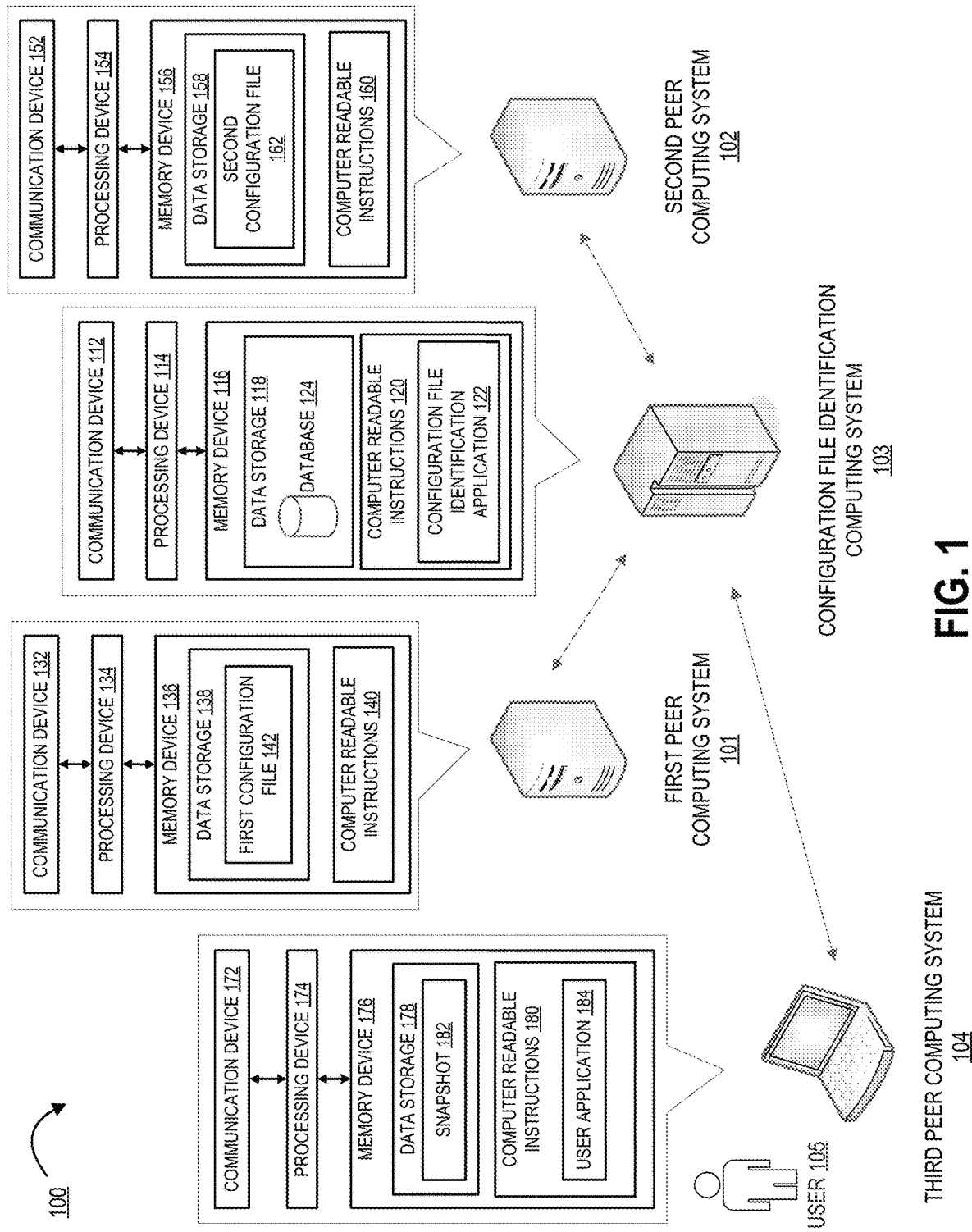

Having thus described embodiments of the invention in general terms, reference will now be made to the accompanying drawings, wherein:

FIG. 1 illustrates an operating environment for the configuration file identification system, in accordance with one embodiment of the present disclosure;

FIG. 2 illustrates a process flow for performing configuration file state identification using multidimensional snapshots, in accordance with one embodiment of the present disclosure; and FIG. 3 illustrates a process flow for performing configuration file state mirroring and reconstruction, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Configuration file" or "config file" as used herein may refer to a data file comprising one or more parameters and/or settings to be used by a computing system's operating system, applications, system processes, and the like. For example, a web server configuration file may contain parameters that specify the IP addresses and/or ports on which a web server will listen for page requests, directory definitions for HTML files, network timeout settings, file and/or directory permissions, firewall settings, and the like.

"System state" as used herein may refer to a set of files and/or parameters that define a configuration of a system (e.g., critical system components). Accordingly, a system state may include protected operating system files, boot files, registry, services, certificates, and the like.

Embodiments of the present disclosure provide a system as described herein provides a system for computing system configuration file state identification using decentralized multidimensional snapshots. In this regard, the configuration files and/or system states of a computing device within a network (e.g., a server) may be constantly monitored by the system for changes to the configuration files and/or system states over time (e.g., changes resulting from data corruption, unauthorized access and/or modification, accidental modification, and the like). Accordingly, the system may comprise a device inventory comprising a list of computing devices for which configuration files and/or system states are to be monitored. In some embodiments, the device inventory may be ranked according to importance and/or vulnerability. For instance, a server hosting one or more critical applications to the proper functioning of a network may be ranked more highly than an individual workstation.

Each computing device that may interact with a device within the device inventory over the network (e.g., client computing devices, peer servers) may take a snapshot of the configuration file and/or system state from the computing device's perspective. For instance, a client computing system that connects to a particular server may, in interacting with the server, be able to see and capture certain types of information about the server (e.g., operating system, open ports, IP address, or the like) which may be indicative of the parameters within the configuration files of the server. In some embodiments, the server itself may also capture and maintain its own set of internal snapshots of the configuration files and/or system states. The snapshots, in addition to the parameters of a particular device, may further include snapshot metadata such as the identity of the device which captured the snapshot, a timestamp indicating the time at which the snapshot was captured, and the like.

The snapshots taken by each computing device may be stored in one or more of various snapshot storage schemes. In one embodiment, the snapshots may be stored in a decentralized manner in the location at which the snapshot was taken. For instance, if the snapshot is taken by a client computing system, the snapshot may also be stored on the client computing system. In other embodiments, the snapshots may be stored in a federated manner, in which certain snapshots may be stored in the location at which the snapshot was taken, while others may be uploaded to a central server. For instance, snapshots of particularly important configuration files may be uploaded to the central server for storage. In yet other embodiments, the snapshots may be stored in a centralized manner (e.g., within a snapshot database).

Based on the snapshots taken with respect to the configuration files and/or system states of a particular computing device within the device inventory, the system may use a data analytics engine to compare the snapshots across the various dimensions (e.g., perspectives from client computing systems, peer systems, and/or the computing device itself) and generate a baseline for the configuration files and/or system states for the computing device. It should be understood that the baseline may comprise a representation of the "real" or "true" parameters within a given configuration file and/or system state. Accordingly, if the system detects a deviation of a configuration file and/or system state from the baseline configuration file and/or system state, the system may determine that configuration file and/or system state has been changed. In embodiments in which the snapshots are stored in a decentralized or federated manner, the system may use a querying tool to retrieve the snapshots for processing by the data analytics engine.

An exemplary embodiment is provided below for illustrative purposes and is not intended to restrict the scope of the disclosure. In one embodiment, the system may be used to track a configuration file of a web server that may be accessed by various types of computing devices over a network (e.g., a client device). The client device, through its interactions with the web server (e.g., by accessing web pages stored on the web server), the client device may take one or more snapshots of the configuration of the web server (e.g., encryption protocols used, certificates, and the like). For instance, the snapshots taken by the client device may indicate that the server uses Hypertext Transfer Protocol Secure (HTTPS) encryption and digital certificates signed by a particular signing authority. The snapshots may then be stored in one or more of the manners described above. Subsequently, the client device may once again connect to the server at a later point in time and take additional snapshots, where the additional snapshots may indicate that the server is no longer using HTTPS encryption or is using expired certificates. Based on the snapshots taken at different timeframes, the system may detect a deviation from the baseline configuration for the web server and thus determine that the configuration files of the web server have been changed or altered. Subsequently, the system may transmit one or more notifications to users associated with the web server (e.g., a web administrator) indicating that the configuration of the server has changed.

Embodiments of the present disclosure also provide a system for configuration file state reconstruction using configuration file mirroring. In such embodiments, alternatively or in addition to configuration file snapshots, the system may mirror at least a portion of a configuration file (e.g., one or more parameters or settings) of a particular computing device across one or more trusted peers. In this regard, the system may identify and select a configuration file of a computing device within the device inventory for mirroring (or "selected computing device"). Once the computing device has been identified, the system may identify and select one or more peer computing devices to host the mirrors of the configuration files and/or parameters. The peer computing devices may be selected based on the identities of the peer computing devices and/or the interactions of the peer computing devices with the computing device to be mirrored. For instance, if the device to be mirrored is a file server owned and/or operated by an entity, the peer computing devices may be selected from one or more clients or servers that may be under the control of the same entity. In other scenarios, the peer computing devices may be connected (e.g., by authenticated and authorized access) to the same private network as the computing device to be mirrored.

Once the peer computing devices have been identified, the system may store a copy of one or more of the configuration file parameters or settings of the selected computing device on the one or more peer computing devices. In some embodiments, each peer computing device may also receive a secret key from the selected computing device, where the secret key may be associated with the one or more parameters or settings of the selected computing device. The system may, in some embodiments, prioritize certain configuration files or parameters based on a data-driven analysis of the importance of such configuration files and/or parameters. Accordingly, the system may store the configuration files and/or parameters on the peer computing devices in such a manner as to allow the configuration files and/or parameters of the selected device to be reconstructed and restored from the copies stored within the peer computing devices. Based on the configuration file information stored on the selected computing device and the peer computing devices, the data analytics engine may establish a baseline for the configuration files and/or system state of the selected computing device. In some embodiments, the system may vary the number of peer computing devices and/or the number of copies of the parameters and/or configuration files that may be distributed and stored based on the relative importance of the parameters and/or configuration files. For instance, particular important settings may be replicated a greater number of times and/or stored on a greater number of peer computing devices in comparison to settings of comparatively lesser importance.

If an authorized change to the configuration files of the selected computing device is made, the system may automatically cause the copies of the configuration files and/or parameters stored on the peer computing devices to be updated based on the authorized change. In this regard, the selected computing device may transmit a record of the changes as well as the secret key to the one or more peer computing devices, each of which will then update their stored copies of the configuration files and/or parameters according to the information received from the selected computing device. As a result, the baseline for the selected computing device may also be updated.

If, however, the system detects that an unauthorized or unintended change has been made to the configuration file of the selected computing device (e.g., by detecting a discrepancy between the configuration file of the selected computing device and the baseline for said selected computing device), the system may initiate a reconstruction and/or restoration process, which may include retrieving the stored copies of the configuration files and/or parameters from the peer computing devices and automatically reverting the changes to the configuration file of the selected computing device. In this way, the system may ensure the validity and integrity of high priority configuration files and/or parameters.

An exemplary embodiment is provided below for illustrative purposes only. In one embodiment, a file server containing a configuration file may be the selected computing device, where the configuration file may comprise one or more parameters (e.g., a first parameter, a second parameter, and the like). Accordingly, the peer computing devices may be computing systems within the same trusted network as that of the file server (e.g., a first peer computing device, a second peer computing device, and the like). The system may store portions of the configuration file across the various peer computing devices (e.g., a first set of parameters may be stored on the first peer computing device, a second set of parameters may be stored on the second peer computing device, and the like). Based on the parameters stored across the peer computing devices as well as the configuration file of the file server, the system may generate a baseline for the configuration file of the file server. Subsequently, an authorized change to the configuration file of the file server (e.g., a change in the network port for file transfers) may be made to the configuration file. The authorized change may trigger the peer computing devices to automatically update the relevant parameters associated with the authorized change. If, on the other hand, an unauthorized or unintended change is made to the configuration file of the file server (e.g., a change to the directory permissions of the file server), the system may use the baseline to determine what parameters were affected by the unauthorized or unintended change and restore the affected parameters to the baseline values.

The system as described herein confers a number of technological advantages over conventional configuration file identification or restoration systems. In particular, by implementing the data analytics engine, the system may ensure the protection of configuration files and system states from unauthorized or unintentional changes through automated identification and/or restoration of such configuration files and system states. In turn, maintaining the integrity of the configuration files of the selected computing devices may further increase the security of the selected computing device itself along with the computing systems that may interact with the selected computing device over a network.

Turning now to the figures, FIG. 1 illustrates an operating environment 100 for the configuration file identification system, in accordance with one embodiment of the present disclosure. In particular, FIG. 1 illustrates a configuration file identification computing system 103 that is operatively coupled, via a network, to a first peer computing system 101, second peer computing system 102, and/or a third peer computing system 104. In such a configuration, the configuration file identification computing system 103 may transmit information to and/or receive information from the first peer computing system 101, the second peer computing system 102, and/or the third peer computing system 104.

It should be understood by one skilled in the art that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a first peer computing system 101 and a second peer computing system 102, some embodiments may include a fewer or greater number of peer computing systems that are part of the device inventory (e.g., computing systems containing configuration files to be identified, tracked, and/or reconstituted by the system). It should also be understood that one or more functions of the systems, devices, or servers as depicted in FIG. 1 may be combined into a single system, device, or server. For instance, in some embodiments, the functions of the first peer computing system 101 and/or the second peer computing system 102 may be performed by the configuration file identification computing system 103, or conversely, the functions of the configuration file identification computing system 103 may be performed by the first peer computing system 101 and/or the second peer computing system 102. Furthermore, a single system, device, or server as depicted in FIG. 1 may represent multiple systems, devices, or servers. For instance, though the configuration file identification computing system 103 is depicted as a single unit, the functions of the configuration file identification computing system 103 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the configuration file identification computing system 103 may be a networked server, desktop computer, laptop computer, routing device, or other type of computing system within the network environment which performs the device identification and selection, data analytics, configuration file identification, and/or configuration file mirroring functions as described herein. Accordingly, the configuration file identification computing system 103 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the first peer computing system 101 and/or the second peer computing system 102. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a database 124, which may be used to store information needed to perform the processes of the configuration file identification computing system 103. For instance, the database 124 may comprise the device inventory which lists the various peer computing devices to be tracked by the system, mirrored configuration files and/or parameters, snapshots from various peer computing devices, outputs from data analysis, and the like.

The memory device 116 may further have computer-readable instructions 120 stored thereon, where the computer-readable instructions 120 may comprise a configuration file identification application 122, which may comprise computer-executable program code which may instruct the processing device 114 to perform certain logic, data processing, and data storing functions of the application to accomplish the entity's objectives. For instance, the configuration file identification application 122 may identify devices to be protected, track configuration files and/or parameters, prioritize devices through data analytics, and the like.

As further illustrated in FIG. 1, the operating environment 100 may further comprise a first peer computing system 101 in operative communication with the configuration file identification computing system 103. In particular, the first peer computing system 101 may be a computing system identified within the device inventory as containing one or more configuration files or parameters to be tracked. Accordingly, the first peer computing system 101 may be a computing system such as a server or networked terminal, though it is within the scope of the disclosure for the first peer computing system 101 to be a device such as a desktop computer, laptop, IoT device, smartphone, tablet, single-board computer, or the like.

The first peer computing system 101 may comprise a processing device 134 operatively coupled to a communication device 132 and a memory device 136 having data storage 138 and computer readable instructions 140 stored thereon. The data storage 138 may comprise a first configuration file 142, which may be a configuration file containing one or more parameters that affect or control the operation of the first peer computing system 101. Accordingly, one or more computing systems within the operating environment 100 may generate and/or store snapshots and/or copies of at least a portion of the first configuration file 142. In some embodiments, the data storage 138 of the first peer computing system 101 may further store snapshots or mirrors of configuration files of other computing systems in the network environment, such as the second peer computing system 102.

The operating environment 100 may further comprise a second peer computing system 102 comprising a processing device 154 operatively coupled to a communication device 152 and a memory device 156 comprising data storage 158 and computer readable instructions 160. The data storage 158 of the second peer computing system 102, similar to that of the first peer computing system 101, may comprise a second configuration file 162, which may be a configuration file containing one or more parameters that affect or control the operation of the second peer computing system 102. In some embodiments, the data storage 158 of the second peer computing system 102 may further store snapshots or mirrors of configuration files of other computing systems in the network environment, such as the first peer computing system 101.

In some embodiments, the operating environment 100 may further comprise a third peer computing system 104. The third peer computing system 104 may be a computing system that may operated by a user 105, such as an administrator, agent, or employee of the entity. Accordingly, the third peer computing system 104 may be a computing system such as a desktop computer, laptop computer, smartphone or smart device, tablet, single board computer, or the like, though it is within the scope of the disclosure for the third peer computing system 104 to be any other kind of computing system as described herein (e.g., a "headless" computing system such as a server). The third peer computing system 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 105.

The third peer computing system 104 may comprise a processing device 174 operatively coupled to a communication device 172 and a memory device 176, the memory device 176 comprising data storage 178 and computer readable instructions 180. The data storage 178 may comprise one or more snapshots 182, which may represent the "view" of the first configuration file 142 and/or the second configuration file 162 from the perspective of the third peer computing system 104. For instance, the third peer computing system 104 may only be able to view a portion of the first configuration file 142 and/or the second configuration file 162 (e.g., as a result of file permissions settings). Accordingly, the snapshot 182 may comprise those portions of the configuration files that the third peer computing system 104 is authorized to view and/or access. The computer readable instructions 180 may comprise a user application 184, which in some embodiments may be an application with a graphical interface that may allow the user 105 to access the first peer computing system 101 and/or the second peer computing system 102. The user application 184 may further be configured to automatically (e.g., without input from the user 105) take snapshots of the configuration files of each computing device within the network with which the third peer computing system 104 interacts. For instance, the user application 182 may cause the third peer computing system 104 to take a snapshot 182 of the first configuration file 142 of the first peer computing system 101 each time the third peer computing system 104 connects to the first peer computing system 101. In this way, the system may be able to track the status of each configuration file over time.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G)

wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

FIG. 2 illustrates a process flow 200 for performing configuration file state identification using multidimensional snapshots, in accordance with one embodiment of the present disclosure. The process begins at block 201, where the system identifies, from a device database, a first peer computing device comprising a first configuration file. The first peer computing device may be a device that the system has identified (e.g., through data analytics) as being a high priority device. Accordingly, the system may provide a way to automatically detect any changes to the device's configuration files and/or settings that may result from unintentional or unauthorized activity. The first configuration file may contain various settings or parameters that may affect the operation of the first peer computing device. In an exemplary embodiment, the first peer computing device may be a server containing data that may be accessible to other computing devices within the network (e.g., a web server hosting website data). Accordingly, the first configuration file may contain settings or parameters such as directory definitions, encryption settings, certificate settings, or the like.

The process continues to block 202, where the system retrieves one or more configuration file snapshots of the first configuration file, wherein the one or more configuration file snapshots comprises a first snapshot of the first configuration file generated at a first point in time. Each computing device that interacts with the first peer computing device (e.g., a second peer computing device) may generate a snapshot of a portion of the first configuration file that is accessible or viewable by the computing device. For instance, a desktop computer that connects to a website hosted on the first peer computing device may be able to view or access certain settings or parameters within the first configuration file (e.g., the first peer computing device is configured to use certain security certificates). A snapshot may be generated by the second peer computing device each time that it connects to the first peer computing device. Accordingly, the snapshots generated over time by the second peer computing device may reflect changes, if any, in the configuration files and/or settings of the first peer computing device as seen from the perspective of the second peer computing device. Continuing the above example, the first snapshot generated by the second peer computing device may indicate that the first peer computing device is configured to serve the hosted website using the HTTPS protocol.

The snapshots may be stored in one or more different types of storage schemes. For instance, the snapshots may be stored in a decentralized manner (e.g., stored locally in the memory of the computing device that generates the snapshot), a federated manner (e.g., snapshots are stored locally and/or within a centralized database), a centralized manner (e.g., all snapshots are stored within a centralized database), or any combination of the foregoing.

The process continues to block 203, where the system generates, based on the one or more configuration file snapshots of the first configuration file, a set of baseline parameters for the first configuration file. The baseline parameters may be generated from various configuration file snapshots that may have been taken at a time in which the configuration file is known to contain valid and/or approved settings (e.g., upon configuration file creation or after an approved modification to the configuration file). Accordingly, the baseline parameters may represent the "approved" values of the parameters or settings of the first configuration file. Subsequently, any additional snapshots of the configuration file may be compared against the baseline parameters to detect any deviations from such approved values.

The process continues to block 204, where the system retrieves a second snapshot of the first configuration file generated at a second point in time, wherein the second point in time occurs after the first point in time. By taking successive snapshots at various points in time, the system may be able to detect changes in the first configuration file based on the various snapshots. Accordingly, the second snapshot of the first configuration file may comprise one or more parameters or settings that are different from the parameters or settings of the first snapshot of the first configuration file. Continuing the above example, the second snapshot may indicate that that the web server is configured to serve the hosted website using the HTTP protocol.

The process continues to block 205, where the system detects, based on comparing the second snapshot with the set of baseline parameters, a deviation of the first configuration file from the set of baseline parameters. For instance, the first snapshot may indicate that the web server is configured to use HTTPS, while the second snapshot indicates that the web server is configured to use HTTP. In other embodiments, the encryption standards used may differ across the various snapshots. As the set of baseline parameters represents the "correct" values of the settings and/or parameters for the first configuration file, the system may identify any deviations from the set of baseline parameters as potentially requiring remediation.

The process concludes at block 206, where the system, based on detecting the deviation, automatically initiates one or more remediation processes to remedy the deviation. In some embodiments, the remediation processes to be initiated may be selected based on the nature of the deviation. For instance, if the system detects that the change in the first configuration file was authorized (e.g., the first configuration file was modified by an authenticated user with the credentials necessary to make the change, such as an administrator), the remediation process may include establishing a new set of baseline parameters which may reflect the authorized change. On the other hand, if the change is detected to have been made unintentionally or in an unauthorized manner, the system may initiate various other types of remediation processes, such as a reset of settings or parameters, network segmentation or isolation of the first peer computing device, automatically transmitting notifications to a user associated with the first computing device (e.g., an administrator or technician), a reset or wipe of the first peer computing device, or the like. The type of remediation process may in some embodiments be based on the identity or nature of the first peer computing device. For instance, if the system has identified the first peer computing device as particularly sensitive or critical (e.g., the device hosts particularly sensitive data), the system may skip less invasive measures (e.g., resetting the parameters) in favor of more invasive measures (e.g., a system wipe).

FIG. 3 illustrates a process flow 300 for performing configuration file state mirroring and reconstruction, in accordance with one embodiment of the present disclosure.

The process begins at block 301, where the system identifies, from a device database, a selected computing device comprising a first configuration file. Similarly to the process for performing configuration file identification, the system may select one or more devices from the device database for mirroring. Accordingly, the selected computing device may comprise a configuration file that the system is configured to restore and/or reconstruct upon detecting unintentional or unauthorized changes.

The process continues to block 302, where the system identifies one or more peer computing devices associated with the selected computing device. The peer computing devices may be trusted computing devices that may interact with the selected computing device over a network. For instance, the peer computing devices may, along with the selected computing device, be computing devices that are under the control of the same entity. It should be understood that the peer computing devices may not necessarily be the same type of computing device as the selected computing device. For instance, if the selected computing device is a file server, the peer computing devices may include not only servers, but also desktop computers, laptop computers, IoT devices, or the like.

The process continues to block 303, where the system generates a plurality of mirrored configuration files, wherein each of the plurality of mirrored configuration files comprises at least a portion of the first configuration file. The system may intelligently generate the mirrored configuration files based on a variety of factors, such as the identity of the selected computing device, the importance or priority of the selected computing device and/or the data stored within the selected computing device (e.g., the configuration file), the number of trusted peer computing devices, or the like. For instance, for particularly high priority servers, a higher level of redundancy (and thus a greater number of mirrored configuration files) may be appropriate.

The process continues to block 304, where the system stores the plurality of mirrored configuration files on the one or more peer computing devices. In some embodiments, the portions of the configuration file that is stored on any of the given peer computing devices may be selected based on the reliability and/or the trustworthiness of each peer computing device. For instance, a peer computing device that is a server with high uptime, reliable network connections, and high levels of security (e.g., installed security updates and/or anti-malware software, configured with encryption and/or firewall settings, and the like), may be considered a more reliable peer computing device than a portable computer with relatively lower uptime, intermittent network connections, and the like. Accordingly, in some embodiments, the more reliable peer computing device may receive a larger and/or higher priority portions of the first configuration file. In some embodiments, the selected computing device may transmit a portion of the configuration file along with a secret key, where the secret key may indicate the authenticity of the portions of the configuration file that are transmitted. Accordingly, if any authorized changes are made to the configuration file, the selected computing device may transmit the changed portions of the configuration file along with the secret key, which may indicate to the peer computing devices that the changes to the configuration file have been authorized.

The process continues to block 305, where the system detects, based on comparing the first configuration file with the plurality of mirrored configuration files, a change in the first configuration file. In doing so, the system may retrieve the plurality of mirrored configuration files from the plurality of peer computing devices, where the plurality of mirrored configuration files, in the aggregate, contain all of the settings and/or parameters within the latest authorized version of the first configuration file. By comparing the first configuration file in its current state with the plurality of mirrored configuration files, the system may be able to determine which, if any, of the settings or parameters within the first configuration file have changed.

The process concludes at block 306, where the system, based on detecting the change in the first configuration file, initiates reconstruction of the first configuration file from the plurality of mirrored configuration files. Upon detecting that an unauthorized change has been made to the first configuration file (e.g., by detecting a change to the first configuration file that was not accompanied by the secret key associated with the selected computing device), the system may replace the changed settings or parameters within the first configuration file with the authorized values for said settings or parameters as retrieved from the plurality of mirrored configuration files. By hosting complete or partial mirrors of the configuration files of each device, the system may provide a seamless and automated way of ensuring the integrity of the configuration files of computing devices within the network environment.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 17/246,111 | SYSTEM FOR COMPUTING SYSTEM CONFIGURATION FILE STATE IDENTIFICATION USING DECENTRALIZED MULTIDIMENSIONAL SNAPSHOTS | Apr. 30, 2021 |

What is claimed is:

1. A system for computing system configuration file state mirroring on peer computing devices, the system comprising:
    a memory device with computer-readable program code stored thereon;
    a communication device; and
    a processing device operatively coupled to the memory device and the communication device, wherein the processing device is configured to execute the computer-readable program code to:
        identify, from a device database, a selected computing device comprising a first configuration file;
        identify one or more peer computing devices associated with the selected computing device;
        generate a plurality of mirrored configuration files, wherein each of the plurality of mirrored configuration files comprises at least a portion of the first configuration file;
        store the plurality of mirrored configuration files on the one or more peer computing devices;
        detect a change in the first configuration file;
        based on detecting the change in the first configuration file, initiate reconstruction of the first configuration file based on one or more of the plurality of mirrored configuration files;
        generate a set of baseline parameters for the first configuration file based on the one or more mirrored configuration files, wherein initiating reconstruction of the first configuration file comprises restoring the first configuration file using the set of baseline parameters;
        detect that one or more authorized changes have been made to the first configuration file; and
        transmit a record of the one or more authorized changes and a secret key associated with the first configuration file to the one or more peer computing devices for updating the respective mirror configuration file on the peer computing device
        based on the one or more authorized changes and the secret key.

2. The system according to claim 1, wherein the computer-readable program code for detecting a change in the first configuration file detects a change in the first configuration file based on comparing the first configuration file with the plurality of mirrored configuration files.

3. The system according to claim 1, wherein the computer-readable program code, when executed, further causes, updating the plurality of mirrored configuration files on each of the one or more peer computing devices.

4. The system according to claim 3, wherein the computer-readable program code, when executed, further causes the processing device to update the set of baseline parameters based on updating the plurality of mirrored configuration files.

5. The system according to claim 1, wherein the computer-readable program code, when executed, further causes the processing device to identify, using a data analytics engine, a set of prioritized parameters within the first configuration file, wherein generating the plurality of mirrored configuration files comprises increasing a level of redundancy of the prioritized parameters.

6. The system according to claim 1, wherein generating the plurality of mirrored configuration files comprises increases a level of redundancy of parameters within the first configuration file based on an identity of the selected computing device.

7. A computer program product for computing system configuration file state mirroring on peer computing devices, the computer program product comprising at least one non-transitory computer readable medium having computer-readable program code portions embodied therein, the computer-readable program code portions comprising executable code portions for:
    identifying, from a device database, a selected computing device comprising a first configuration file;
    identifying one or more peer computing devices associated with the selected computing device;
    generating a plurality of mirrored configuration files, wherein each of the plurality of mirrored configuration files comprises at least a portion of the first configuration file;
    storing the plurality of mirrored configuration files on the one or more peer computing devices;
    detecting a change in the first configuration file; and
    based on detecting the change in the first configuration file, initiating reconstruction of the first configuration file based on one or more of the plurality of mirrored configuration files;
    generating a set of baseline parameters for the first configuration file based on the one or more mirrored configuration files, wherein initiating reconstruction of the first configuration file comprises restoring the first configuration file using the set of baseline parameters;
    detecting that one or more authorized changes have been made to the first configuration file; and transmitting a record of the one or more authorized changes and a secret key associated with the first configuration file to the one or more peer computing devices for updating the respective mirror configuration file on the peer computing device based on the one or more authorized changes and the secret key.

8. The computer program product according to claim 7, wherein detecting a change in the first configuration file detects a change in the first configuration file based on comparing the first configuration file with the plurality of mirrored configuration files.

9. The computer program product according to claim 7, wherein the computer-readable program code portions further comprise executable code portions for updating the plurality of mirrored configuration files on each of the one or more peer computing devices.

10. The computer program product according to claim 9, wherein the computer-readable program code portions further comprise executable code portions for updating the set of baseline parameters based on updating the plurality of mirrored configuration files.

11. The computer program product according to claim 7, wherein the computer-readable program code portions further comprise executable code portions for identifying, using a data analytics engine, a set of prioritized parameters within the first configuration file, wherein generating the plurality of mirrored configuration files comprises increasing a level of redundancy of the prioritized parameters.

12. The computer program product according to claim 7, wherein generating the plurality of mirrored configuration files comprises increases a level of redundancy of parameters within the first configuration file based on an identity of the selected computing device.

13. A computer-implemented method for computing system configuration file state mirroring on peer computing devices, wherein the computer-implemented method comprises:
    identifying, from a device database, a selected computing device comprising a first configuration file;
    identifying one or more peer computing devices associated with the selected computing device;
    generating a plurality of mirrored configuration files, wherein each of the plurality of mirrored configuration files comprises at least a portion of the first configuration file;
    storing the plurality of mirrored configuration files on the one or more peer computing devices;
    detecting a change in the first configuration file;
    based on detecting the change in the first configuration file, initiating reconstruction of the first configuration file based on one or more of the plurality of mirrored configuration files;
    generating a set of baseline parameters for the first configuration file based on the one or more mirrored configuration files, wherein initiating reconstruction of the first configuration file comprises restoring the first configuration file using the set of baseline parameters;
    detecting that one or more authorized changes have been made to the first configuration file; and
    transmitting a record of the one or more authorized changes and a secret key associated with the first configuration file to the one or more peer computing devices for updating the respective mirror configuration file on the peer computing device based on the one or more authorized changes and the secret key.

14. The computer-implemented method according to claim 13, wherein detecting a change in the first configuration file detects a change in the first configuration file based on comparing the first configuration file with the plurality of mirrored configuration files.

15. The computer-implemented method according to claim 13 further comprising updating the plurality of mirrored configuration files on each of the one or more peer computing devices.

16. The computer-implemented method according to claim 15, wherein the computer-implemented method further comprises updating the set of baseline parameters based on updating the plurality of mirrored configuration files.

17. The computer-implemented method according to claim 13, wherein the computer-implemented method further comprises identifying, using a data analytics engine, a set of prioritized parameters within the first configuration file, wherein generating the plurality of mirrored configuration files comprises increasing a level of redundancy of the prioritized parameters.

18. The computer-implemented method according to claim 13, wherein generating the plurality of mirrored configuration files comprises increases a level of redundancy of parameters within the first configuration file based on an identity of the selected computing device.

* * * * *